US006428762B1

(12) United States Patent
Khabashesku et al.

(10) Patent No.: US 6,428,762 B1
(45) Date of Patent: Aug. 6, 2002

(54) POWDER SYNTHESIS AND CHARACTERIZATION OF AMORPHOUS CARBON NITRIDE, A-$C_3N_4$

(75) Inventors: Valery N. Khabashesku, Houston; John L. Margrave, Bellaire, both of TX (US); John L. Zimmerman, Lincoln Park, MI (US)

(73) Assignee: William Marsh Rice University, Houston, TX (US)

( * ) Notice: Subject to any disclaimer, the term of this patent is extended or adjusted under 35 U.S.C. 154(b) by 6 days.

(21) Appl. No.: 09/626,173

(22) Filed: Jul. 27, 2000

Related U.S. Application Data

(60) Provisional application No. 60/145,733, filed on Jul. 27, 1999.

(51) Int. Cl.[7] ............................................. C01C 3/00
(52) U.S. Cl. ...................................................... 423/384
(58) Field of Search ......................................... 423/384

(56) References Cited

U.S. PATENT DOCUMENTS 5,110,679 A  *  5/1992  Haller et al. ................. 423/384

FOREIGN PATENT DOCUMENTS

DE           19706028 C1      2/1997   ........... C08G/73/06

OTHER PUBLICATIONS

Matsukura et al, "Infrared Absorption Spectroscopy Measurements of Amorphous $CN_x$ films Prepared in $CH_4/N_2$ r.f. discharge", Thin Solid Films (1999), 349(1,2), 115–119 (Abstract only).*

Cohen, M.L., "Calculation of bulk moduli of diamond and zinc–blende solids", Phys. Rev. B vol. 32, No. 12, 7988–7991, (1985). (No month).
Liu, AY and Cohen, M.L., "Prediction of New Low Compressibility Solids", Science, vol. 245, 841–843, (1989).
Liu, A. Y. and Cohen, M.L., "Structural properties and electronic structure of low–compressibility materials: B–$Si_3N_4$ and hypothetical B–$C_3N_4$", Phys. Rev. B., vol. 41, No. 15, 10727–10734, (1990). (No month).
Itoh, S., "Electronic Properties of BCN Films: Theory and Experiment", Diamond Films and Technology, vol. 7, No. 3, 195–209, (1997). (No month).
Kawaguchi, M., "B/C/N Materials Based on the Graphic Network", Adv. Mater. 9, No. 8, 615–625, (1997). (No month).
Kar, T., Cuma, M. and Scheiner, S, "Structure, Stability and Bonding of $BC_2N$: An ab Initio Study", J. Phys. Chem A, 10134–10141, (1998). (No month).
Riedel, R., Klenzie, A, Dressler, W., Ruwisch, L, Bull, J., Aldinger, F, "A silicoboron carbonitride ceramic stable to 2,000° C", Nature, vol. 382, 796–798, (1996). (No month).

(List continued on next page.)

Primary Examiner—Wayne A. Langel
(74) Attorney, Agent, or Firm—Conley, Rose & Tayon, P.C.

(57) ABSTRACT

Carbon nitride powder prepared by solid-state reaction between cyanuric chloride or its fluoro analogue and lithium nitride. The determined, by elemental analysis, atomic N/C ratio (1.33) in the synthesized material is consistent with $C_3N_4$ stoichiometry. Combined material characterization data, obtained by FTIR, Raman, UV-Vis, (13C) MAS NMR, XPS, TGA/DTA and pyrolysis-EIMS methods, provide substantial evidence for graphite-like $sp^2$-bonded structure composed of building blocks of s-triazine rings bridged by the three-fold coordinated nitrogen atoms in the bulk carbon nitride.

24 Claims, 12 Drawing Sheets

OTHER PUBLICATIONS

Rooke, M.A., Sherwood, P.M.A., "Surface Studies of Potentially Oxidation Protective Si—B—N—C Films for Carbon Papers", Chem. Mater 9, 285–296, (1997). (No month).

Williams, D., Kouvetakis, J., O'Keeffe, M., "Synthesis of Nanoporous Cubic In(CN)3 and In1–xGax(CN)3 and Corresponding Inclusion Compounds", Inorg. Chem.,37, 4617–4620, (1998). (No month).

Brousseau, L.C., Williams, D., Kouvetakis, J., O'Keefe, M., Synthetic Routes to Ga(CN)3 and MGa(CN)4 (M=Li, Cu), J. Am. Chem. Soc., 119, 6292–6296, (1997). (No month).

Teter, D.M., Hemley, R.J., "Low–Compressibility Carbon Nitrides", Science, vol. 271, 53–55, (1996).

Lowther, J.E., "Relative stability of some possible phases of graphitic carbon nitride", Phys. Rev.B., vol. 59, No. 18, 11683–11686, (1999). (No month).

Zhang, Z, Guo,H., Zhong, G., Yu, F., Xiong, Q, Fan, X, "Formation of cubic C3N4 thin films by plasma enhanced chemical vapor deposition", Thin Solid Films 346, 96–99, (1999). (No month).

Alves, I., Demazeau, G., Tanguy, B., Weill, F., "On a new model of the graphitic form of C3N4", Solid State Comm 109, 697–701, (1999). (No month).

Wang, En–Ge, "A New Development in Covalently Bonded Carbon Nitride and Related Materials", Adv. Mater, 11, No. 13, 1129–1133, (1999). (No month).

Kovetakis, J., Bandari, A., Todd, M., Wilkens, B., Novel Synthetic Routes to Carbon–Nitrogen Thin Films, Chem Mater. 6, 811–814, (1994). (No month).

Niu, C., Lu, Y.Z., Lieber, C., "Experimental Realization of the Covalent Solid Carbon Nitride", Science, vol. 261, 334–337, (1993). (No month).

Bhusari, D.M., Chen, C.K., Chen, K.H., Chuang, T.J., Chen, L.C., Lin, M.C., "Composition of SiCN crystals consisting of a predominantly carbon–nitride network", Mater.Rev., vol. 12, No. 2, 322–325, (1997). (No month).

Chen, Y., Guo, L., Wang, E.G., "Experimental evidence for a–and B phases of pure crystalline C3N4 in films deposited on nickel substrates", Philos.Mag. Lett. vol. 75, No. 3, 155–162, (1997). (No month).

Hu, J., Yang, P. Lieber, C. "Nitrogen–driven $sp^3$ to $sp^2$ transformation in carbon nitride materials", Phys. Rev. B. vol. 57, 3185–3188, (1998). (No month).

Zhang, Z., Guo, H., Zhong, G., Yu, F., Qihua, X., Fan, X., "Formation of cubic C3N4 hin films by plasma enhanced chemical vapor deposition", Thin Solid Films 346, 96–99, (1999). (No month).

Kroll, P., Hoffmann, R., "Theoretical Tracing of a Novel Route from Molecular Precursors through Polymers to Dense, Hard C3N4 Solids", J. Am. Chem. Soc. 121, 4696–4703, (1999). (No month).

Nesting, D., Badding, J., "High–Pressure Synthesis of sp2–Bonded Carbon Nitrides", Chem. Mater. 8, 1535–1539, (1996). (No month).

Badding, J.V., "High–Pressure Synthesis, Characterization, and Tuning of Solid State Materials", Annu. Rev. Maater. Sci 29. 631–658, (1998). (No month).

He, D.W., Zhang, F.X., Zhang, X.Y., Qin, Z.C., Zhang, M., et al., "Synthesis of carbon nitride crystals at high pressures and temperatures", J. Mater. Res. 13, 3458–3462, (1998). (No month).

Wiley, J., Kaner, R., "Rapid Solid–State Precursor Synthesis of Materials", Science 255, 1093–1097, (1992). (No month).

Fitzmaurice, J.C., Hector, A.L., Parkin, I.P., "Low–Temperature Routes to Early Transition–metal Nitrides", J. Chem. Soc. Dalton Trans, 2435–2438, (1993). (No month).

Xie, Yi, Qian, Yitai, Wang, Wenzhong, Zhang, Shuyuan, Zhang, Yuheng., "A Benzene–Thermal Synthetic Route to Nanocrystalline GaN" Science vol. 272, 1926, (1996). (No month).

Khabashesku, V.N., Schultz, A., Hauge, R.H., Margrave, J.L., "Cryogenic Synthesis of Carbon–Nitrogen Thin Films by Ion Beam Co–Deposition", Proceedings of International Conference on Low–Temperature Materials, Moscow, Russia Abstract, 81, (1994). (No month).

Khabashesku, V.N., Margrave, J.L., "Neutralized Nitrogen Atom Beam Assisted Cryogenic Synthesis of Nitride Materials", Proceedings of the IXth International Conference on High Temperature Materials, Penn State University, 108, (1997). (No month).

Khabashesku, V.N., Margrave, J.L., Waters, K., Schultz, J.A., "Cryogenic deposition of carbon nitride films using a neutralized atomic nitrogen beam", Thin solid Films, 62–68, (2000). (No month).

Bernard, D.J., Linnen, C., Harker, A., Michels, H.H., Addison, J.B., Ondercin, B.J., "Dissociation of Cyanogen Azide: An Alternative route to Synthesis of Carbon Nitride", J. Phys. Chem B. 102, 6010–6019, (1998). (No month).

Zhang, M., Nakayama, Y.J., "Effect of Ultraviolet light irradiation on amorphous carbon nitride films", J. Appl. Phys. 82, 4912–4915, (1997). (No month).

May, H.J., "Pyrolysis of Melamine", J. App. Chem., 340–344, (1959). (No month).

Togashi, H., Koga, T., Kakudate, Y., Fujiwara, S., Kubota, M., Fukuda, K., Nakawaga, H., Kawaguchi, M., "Carbon Dioxide Lase Desorption/Ionization Mass Spectrometry of a Mixture of s–Triazine Oligomers Analyzed by a Method which Assumes a Pattern of Chemical Formulae", Rapid Communications in Mass Spectrometry, vol. 8, 465–470, (1994). (No month).

Popov, C., Saito, K. Yamamoto, K., Ouchi, A., Nakamura, T., Ohana, Y., Koga, Y.J., "Synthesis of nitrogen–rich B—C—N materials form malamine and boron trichloride", Mater. Science 33, 1281–1286, (1998). (No month).

Costa, L., Camino, G., "Thermal Behaviour of Melamine", J. Thermal. Anal., vol. 34, 423–429, (1998). (No month).

Lu, T.R., Chen, L.C., Chen, K.H., Dhusari, D.M., Chen, T.M., Kuo, C.T., "Sputtering process of carbon nitride films by using a novel bio–molecular C—N containing target", Thin Solid Films, 332, 74–79, (1998). (No month).

Bousetta, A., Lu, M., Bensaoula, A., "Formation of carbon nitride films of Si(100) substrates by electron cyclotron resonance plasma assisted vapor deposition", Appl. Phys. Lett.65, 696–697, (1994). (No month).

Lu, Y.F., Ren, Z.M., Chong, T.C., Cheong, B.A., Pang, S.I., Wang, J.P., Li, K., "Influence of ion–beam energy and substrate termperature on the synthesis of carbon nitride thin films by nitrogen–ion–assisted pulsed laser deposition", J. Appl. Phys. vol. 86, No. 9, 4954–4958, (1999). (No month).

Quirke, J.M.E., "1,3,5–Triazines in Comprehensive Heterocyclic Chemistry", Comprehensive Heterocyclic Chemistry vol. 3, A.R. Katrizky Ed., Pergamon Press, Oxford—New York, 457–469 (1984). (No month).

Riedel, R., Kroke, E., Greiner, A., Gabriel, O., Ruwisch, L., Nocolich, J., "Inorganic Solid–State Chemistry with Main Group Element Carbodiimides", J. Chem. Mater, 2964–2979, (1998). (No month).

Kawguchi, M., Tokimatsu, Y., Nozaki, K., Kabaragi, Y., Hishiyama, Y., "Preparation and Properties of a New Hard Material of Composition $C_3N_{3\cdot6-4.5}O_{1\cdot1-1}.2H_{4.1-4.2}$", Chem. Lett, 1003–1005, (1997). (No month).

* cited by examiner

POWDER SYNTHESIS AND CHARACTERIZATION OF AMORPHOUS CARBON NITRIDE, A-C₃N₄

RELATED CASES

This application claims the benefit of U.S. Provisional Application No. 60/145,733 filed Jul. 27, 1999 and entitled "Solid State Synthesis of Amorphous Carbon Nitride." The disclosure of that application is incorporated herein in its entirety.

STATEMENT OF FEDERALLY SPONSORED RESEARCH

This invention was made with government support under grant DAAH04-96-1-0307 awarded by the US Army Research Office. The United States government has certain rights in the invention.

TECHNICAL FIELD OF THE INVENTION

The present invention relates generally to carbon nitride and more particularly to a method for making $C_3N_4$. Still more particularly, the present invention relates to a method for solid-state synthesis of carbo-nitride powders in bulk quantities using halogenated triazines and alkaline metal nitrides as reagents.

BACKGROUND OF THE INVENTION

In many materials, the manner in which the atoms forming the material are arranged determines many of the physical properties of that material. For example, when carbon atoms are merely assembled randomly, the result is graphite, which is opaque to visible light and relatively soft. The carbon atoms in graphite are not arranged in any ordered fashion, so graphite is unstructured, or "amorphous." When the same carbon atoms are subjected to extremely high pressures and high temperatures, however, they align themselves in the crystal structure commonly referred to as diamond. As is well known, diamond is clear to visible light, is very hard, and has a tight, cubic crystal structure. A difference in crystal structure between two materials having identical chemical compositions, such as the difference between graphite and diamond, is referred to as polymorphism.

Various carbon-nitrogen compositions are known in the art. In particular, the preparation of binary, ternary, and quaternary carbo-nitride materials, such as $C_3N_4$, B—C—N, Al—C—N, Al—B—C—N, Si—B—C—N, etc., is an area of current interest. Crystalline forms of these non-oxide lightweight materials are expected to possess a combination of extreme hardness, oxidation resistance and chemical inertness.[1-10] The most exciting material in this family is the crystalline form of a particular carbon nitride, $C_3N_4$, for which a hardness challenging that of diamond is predicted.[1-3] To date, this material has only been postulated and has never been successfully created in commercially meaningful quantities.

Based on its predicted crystal structure, this crystalline form of $C_3N_4$ is commonly designated $\beta$-$C_3N_4$. The $\beta$ designation is derived from the crystal structure for $\beta$-$Si_3N_4$, which is known and is analogous to the expected structure of the desired superhard form of $C_3N_4$.

In addition to this potentially superhard $\beta$-phase, the existence of $\alpha$-, cubic, pseudocubic and graphitic (amorphous) polymorph phases of carbon nitride have been recently suggested on basis of calculations[11,12] and experiments.[13,14] In fact, numerous experimental attempts to synthesize the $\beta$-form of carbon nitride using various chemical and physical thin film deposition techniques[15] have produced predominantly amorphous materials that lack the desired hardness and have nitrogen contents that are significantly different than the 57 at. % that would be expected for $C_3N_4$. For example, several methods of making $C_2N$, $C_2N_2$, and $C_4N_5$ materials are known in the art. Because of their different carbon:nitrogen ratios, these materials have different crystal structures and thus different mechanical properties from the predicted behavior for $\beta$-$C_3N_4$.

One possible exception to the foregoing characterization lies in the thin films prepared from single-source precursors by J. Kouvetakis et al.[16] and others. Although these films are asserted to have the desired $C_3N_4$ stoichiometry, $^{13}C$ NMR analysis does not confirm the suggested a triazine-based, $\beta$-structure for this material. The observation of small $\alpha$-$C_3N_4$ and $\beta$-$C_3N_4$ or cubic $C_3N_4$ crystallites embedded in an amorphous carbon nitride film has also been reported.[15, 17-21] However, the true nature of these crystallites will remain uncertain until large crystals of this carbon nitride are synthesized and precisely characterized, and their mechanical properties tested. On the basis of the large amount of experimental results available so far, it has been suggested that the physical deposition methods that are known in the art do not yield the desired phases, and certainly do not yield the desired phase in bulk or in commercially meaningful amounts ("gram amounts").[20,22]

Hence, a method for producing $C_3N_4$ in bulk is desired.

SUMMARY OF THE INVENTION

The present invention provides an effective method for producing bulk amounts of a carbon nitride having the composition $C_3N_4$ and thus a carbon:nitrogen ratio of 3:4. According to the preferred embodiment, carbo-nitride powders having the desired composition can be produced in bulk quantities using a halogenated triazines and an alkaline metal nitrides as reagents. More specifically, the reagents comprise $C_3N_3X_3$ where X is a halogen, and $M_3N$ where M is an alkaline metal. It has been found that combining the two reagents in dry powdered form, heating them to a temperature above the boiling point of the triazine ($C_3N_3X_3$) and holding them at an elevated temperature for a predetermined period of time produces bulk quantities of a compound having a C:N ratio of 3:4. As used herein, the designation a-$C_3N_4$ refers to a composition having $C_3N_4$ stoichiometry and an amorphous ("a-") structure.

The present approach, which is based on fast solid state reactions, is particularly attractive since: (i) it uses the relatively cheap reagents and does not require synthesis of single-source precursors, as in the previously reported preparation of carbo-nitride; (ii) it produces powders with a higher nitrogen content than, for example, the carbon nitride powders of approximately $C_4N_5$ stoichiometry described in German Patent DE 197 06 028.5, 1997[45], and (iii) it may allow the design of reaction routes leading to production of not only binary, but also ternary and quaternary carbo-nitride materials with controlled stoichiometry, morphology, mechanical and electric properties. Ternary and quaternary carbo-nitride materials are those in which one or two, respectively, additional elements are present in the material in addition to carbon and nitrogen.

BRIEF DESCRIPTION OF THE DRAWINGS

For a more detailed understanding of the invention, reference is now made to the accompanying Figures, wherein.

DETAILED DESCRIPTION OF THE PREFERRED EMBODIMENTS

The present process uses dry powdered reagents and is carried out at temperatures that are easily within the capabilities of conventional manufacturing furnaces. According to one embodiment, bulk quantities of sp$^2$-bonded a-C$_3$N$_4$ can be manufactured in bulk quantities using a halogenated triazine and an alkaline metal nitride as reagents. More specifically, the present process comprises mixing dry powdered C$_3$N$_3$X$_3$, where X is a halogen, with M$_3$N where M is an alkaline metal. Hence, X can be fluorine, chlorine, bromine, or iodine and M can be lithium, sodium, potassium, rubidium or cesium. It has been found that combining the two reagents in dry powdered form, heating them to a temperature above the boiling point of the triazine (C$_3$N$_3$X$_3$) and holding them at an elevated temperature for a predetermined period of time produces bulk quantities of a compound having a C:N ratio of 3:4.

Figure 1:
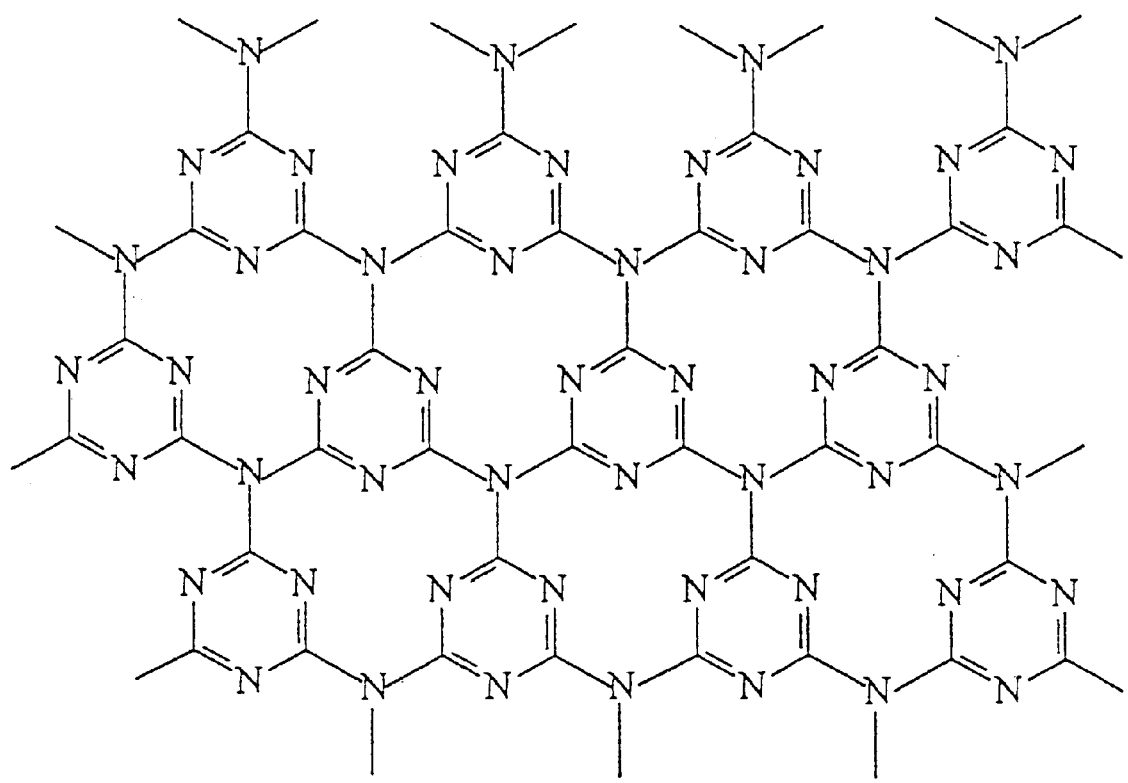
FIG. 1 is a schematic illustration of the sp$^2$-Bonded structure of a-C$_3$N$_4$.

The use of cyanuric chloride C$_3$N$_3$Cl$_3$ or its fluoro-analogue, C$_3$N$_3$F$_3$, as sp$^2$ C=N precursors and the use of lithium nitride Li$_3$N as a nitridation and cross-linking agent have been discovered to be effective for the syntheses of nitrogen-rich carbo-nitride powders. These reactions are most likely to result in a three-fold N-bridged s-triazine ring structure, as shown in FIG. 1, and to proceed according to the following general scheme:

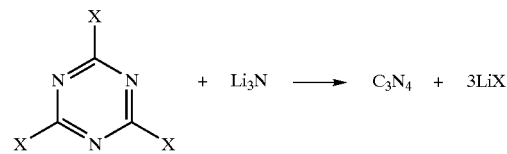

where X=F, Cl. It is expected that other halogens will likewise be useful in combination with the traizine reagent, and that other alkaline metals will be useful in the nitridation and cross-linking agent.

Experimental Section

Cyanuric chloride (99%, Sigma/Aldrich) was sublimated twice in vacuum before the use. Cyanuric fluoride (99%, Alfa) and lithium nitride (99.5%, Strem) were used as received. The small-scale reactions were carried out in a sealed thick-wall Pyrex glass ampules. The larger scale syntheses were performed in a closed stainless steel or Monel tube reactor.

In a typical example of these experiments, 2214 mg (12 mmol) of C$_3$N$_3$Cl$_3$ and 630 mg (18 mmol) of Li$_3$N fine powders were mixed together in a N$_2$-filled dry box, loaded into a stainless steel reactor, which afterwards was sealed with a leak-tight con-flat cap. The reactor was taken out of the dry box and suspended in a vertical furnace by a sample holder of an air-driven vibrator, which was kept in operation until the end of reaction. The furnace temperature was gradually and slowly raised to about 380° C., held for 2–4 hours, and then brought back to room temperature.

It has been found that a certain minimum temperature must be obtained before the reaction will begin to take place. For the reagents described above, that temperature is about 320° C. A preferred reaction temperature is 380° C. While the reactor was not heated above this temperature, it is believed that temperatures inside the sample may be significantly higher during the early phases of the reaction, as a result of the heat released by the exothermic reaction. In the present case, the small sample sizes and the thermal inertia of the equipment surrounding the sample reduced the effect of the heat generated by the reaction. In some instances, such as where the sample is much larger, it may be necessary to control the sample temperature more actively to avoid overheating, ask discussed below.

When the reaction was complete, the resulting powder was washed with water on a 0.2 μm Cole-Parmer PTFE filter membrane to remove the reaction byproduct LiCl. The remaining dark-brown product was dried overnight at about 100° C. under vacuum. The powder obtained in this manner weighed 1092 mg (98.5% of the theoretically expected for C$_3$N$_4$). A microprobe analysis indicated that the powders prepared by the described method are nitrogen-rich with the following varying compositions: C$_{0.37-0.42}$N$_{0.55-0.58}$O$_{0.02-0.05}$Cl$_{0.002-0.005}$.

The same reaction proceeded faster (0.5 hr to completion) and at lower temperature (300° C.) in a Monel reactor; however, the obtained orange-colored powder contained up to 2–5 at. % Cl. A similar product was prepared when the synthesis was carried out in a sealed glass tube, but had a significantly lower yield and much longer reaction time (24 hrs). This strongly suggests that transition metals (Fe, Ni, Cu) present in the metal reaction containers had a catalytic effect on the reaction. At the same time, the presence of extraneous elements (Fe, Ni, Cu) in the reaction product is significantly increased, thus reducing its purity.

Materials Characterization

The FTIR spectra of the carbon nitride powders pressed into a KBr pellet for purposes of optical (IR) analysis were collected on a Perkin Elmer Paragon 1000 FTIR spectrometer with 1 cm$^{-1}$ resolution. Raman spectroscopy measurements for the powders placed on the top of a standard microscope slide were carried out on a Reninshaw System 1000 micro-Raman spectrometer with an 1800 line/mm grating using 514.5 nm Ar ion laser. UV-Vis spectra were recorded on GBC UV/VIS 918 spectrophotometer. Quantitative elemental analyses were performed with the Cameca SX-50 electron microprobe analyzer equipped with PGT energy dispersive spectrometer (EDS) using the following parameters: acceleration voltage of 15 kV, beam current of 15 nA, beam diameter of 20 $\mu$m, and peak and background counting time of 20 s. XPS data were collected with the help of Physical Electronics PHI 7500 X-ray photoelectron spectrometer using Al K$\alpha$ radiation source (1486.6 eV) with a power setting of 350 W and an analyzer pass energy of 23.5 eV. $^{13}$C MAS NMR spectra of powders packed into a 7 mm rotor were recorded using Bruker Instruments 200 MHz spectrometer with a 90° pulse width of 4 $\mu$s and relaxation delay of 10 s and referenced to $^{13}$C chemical shift of glycine carbonyl at 176.2 ppm. Thermal gravimetric analyses were done using a TA Instruments TGA-DTA 2960 analyzer. Pyrolysis-MS data were obtained with the Finnigan-MAT 95 mass spectrometer. Scanning electron microscopy (SEM) was carried out using a Jeol model JSM-6320F field emission microscope at 30 keV beam energy. X-ray diffraction data were collected with a Siemens powder diffractometer using a Cu K$\alpha$ radiation source.

The powder produced as described above was placed into a hardened steel die and densified at 5000 psi for 5 min to form pellets. Disk-shaped specimens of carbon nitride were fabricated by cold isothermal pressing at 55000 psi of the pellets sealed into a latex bag. Electric conductivity measurements were performed on disk-shaped ceramic samples using a four-point method.

Results and Discussion

The orange or dark-brown colored powders, isolated after complete removal of the reaction byproducts (LiCl or LiF), did not melt at temperatures up to as high as 400° C. and also did not dissolve in common organic solvents, hinting at a high-molecular nature of synthesized materials. Solvation at some degree (about 10–20 mg/L) was achieved for finely ground powder by sonication in water or alcohol, which produced a clear light-yellow solution, stable to precipitation for hours. According to elemental analyses (Galbraith Laboratories, Inc.), the overall N/C at. % ratio in the prepared powders was approximately 1.33, which is in agreement with the C$_3$N$_4$ stoichiometry. Besides carbon and nitrogen, the analyses have yielded about 0.7 wt. % hydrogen content in the samples. The electron microprobe studies of powders also revealed that they contain 2–4 at. % oxygen and trace amounts of halogens (Cl or F). These data thus indicate the likely presence of some OH, NH and NH$_2$ functional groups in the polymer structure of powders studied.

Figure 2:
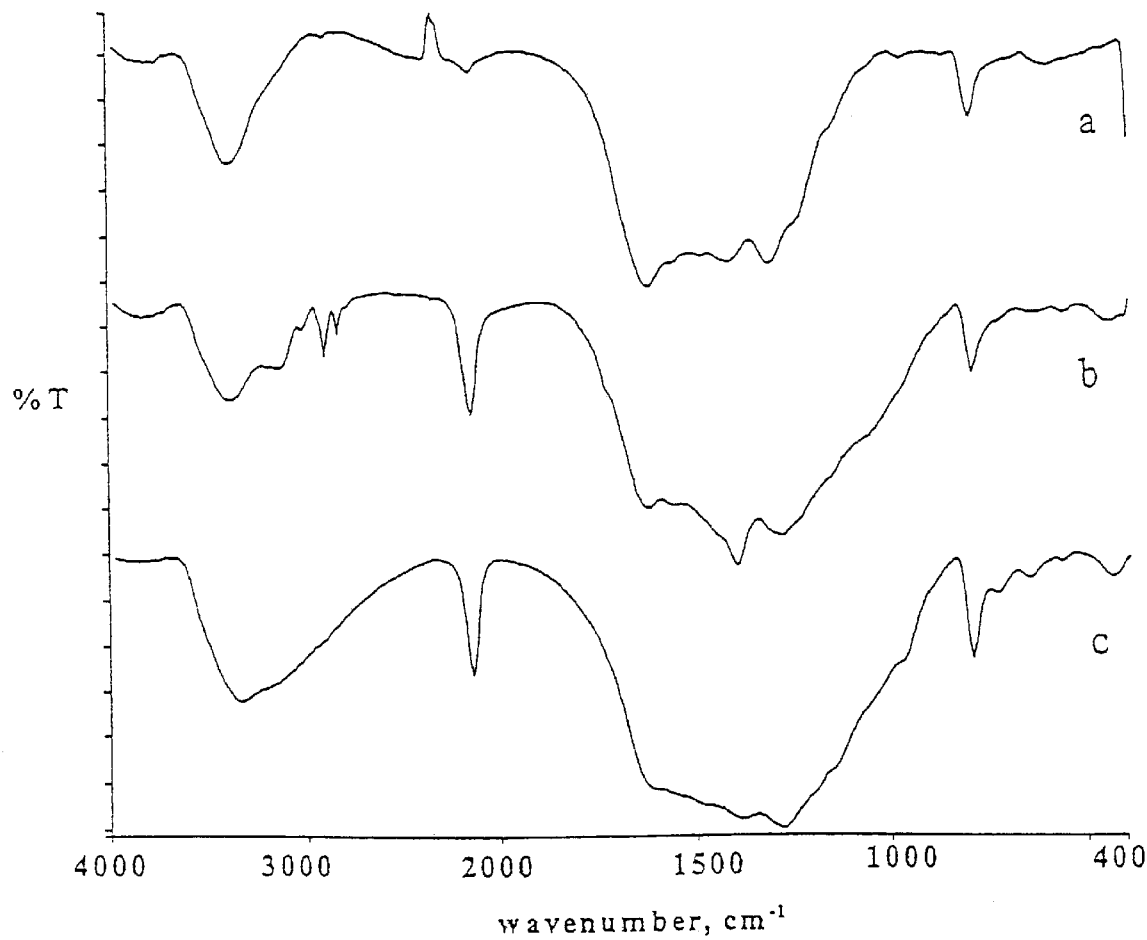
FIG. 2 is a plot showing the FTIR spectra of (a) a-C$_3$N$_4$ powder synthesized according to the present invention in a Monel reactor at 300° C., (b) the same material annealed to 650° C., and (d) the same powder synthesized in stainless steel reactor at 380° C.

The FTIR spectra of these newly synthesized carbon nitride bulk materials have shown some features very similar to those of nitrogen-rich carbo-nitride thin films, observed earlier[29,16,30,32]. As shown in FIG. 2$a$, the spectrum of orange powder shows broad bands of the stretching and deformation modes of NH$_2$ groups at 3424 and 1627 cm$^{-1}$ (as well as an overlapping band of OH stretching), weak band at 2162 cm$^{-1}$ due to the cyano group stretch, and a group of multiple bands characteristic for s-triazine ring vibrations, at 1561 cm$^{-1}$ (quadrant stretch), 1490 and 1421 cm$^{-1}$ (double semicircle stretchings) and 805 cm$^{-1}$ (out-of-plane ring bending by sextants).[32] The strong band observed in this spectrum at 1314 cm$^{-1}$ characterizes the C—N stretch in the three-fold N-bridge linking the triazine rings. The NH bridge-coupled triazine rings are also likely to be present, as well as terminal NH$_2$ and NHCN groups. They are likely to induce the loss of three-fold axis of symmetry in the polymer structure shown in FIG. 1 and result in appearance of double bands in the spectrum, e.g., an already mentioned band of semicircle ring stretch at 1490 cm$^{-1}$ and a band of double ring quadrant stretch at about 1580–1600 cm$^{-1}$, which is overlapped by a strong NH$_2$ deformation band, as shown in FIG. 2.

Annealing of the powders to 650° C. in vacuum caused an increase of absorption of the C$\equiv$N group at 2162 cm$^{-1}$ and reduction of intensities of bands of NH$_2$ and N—C vibrations at 3424, 1627 and 1314 cm$^{-1}$, respectively, in the FTIR spectra of FIG. 2$b$ due to a loss of ammonia probably accompanied by a partial rearrangement and destruction of s-triazine rings under high temperatures, as observed earlier for melamine polymerization products.[33-36] Since somewhat similar secondary processes are likely to take place during the carbon nitride preparation in stainless steel reactor, proceeding at a higher reaction temperature than one done in Monel reactor, the spectrum of the obtained powder shown in FIG. 2$c$ shows as strong absorption of the cyano group at 2162 cm$^{-1}$ as the spectrum of annealed material shown in FIG. 2$b$.

Figure 3:
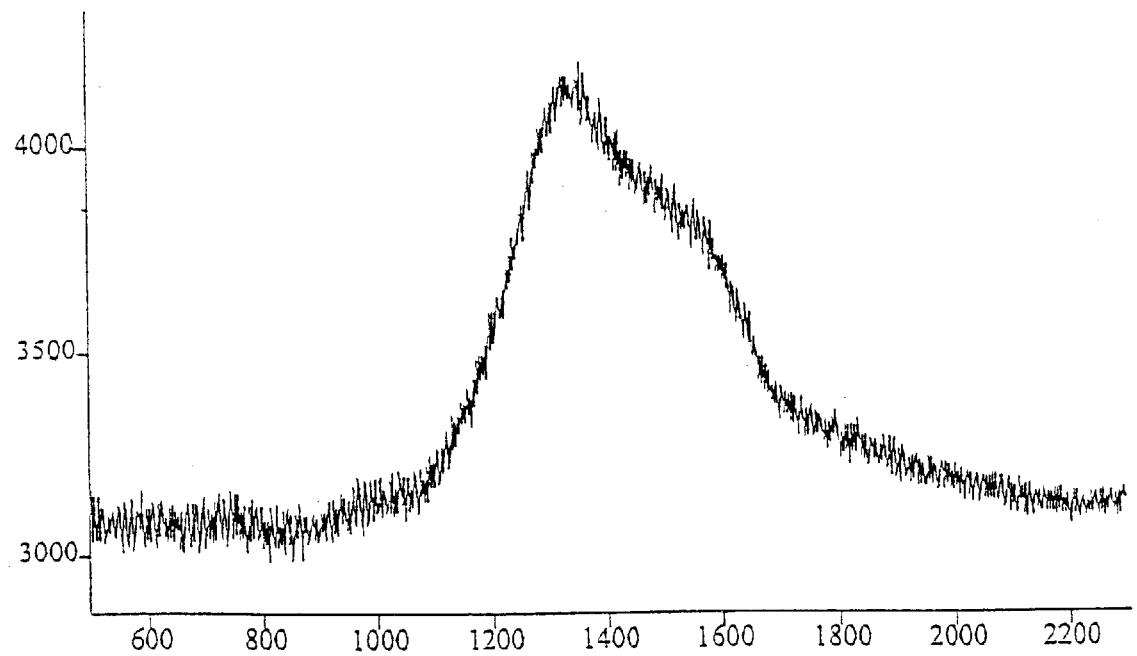
FIG. 3 is a plot showing the Raman spectrum of a-C$_3$N$_4$ powder synthesized according to the present invention.

Referring now to FIG. 3, a typical Raman spectrum of carbon nitride powder shows two broad peaks with maxima at about 1340 and 1545 cm$^{-1}$, corresponding to D and G Raman bands of amorphous graphitic carbon, respectively. The locations of these peaks resemble ones typically observed for carbon nitride thin films of an average C$_2$N composition[37-39]; however, unlike them, in the Raman spectra of a-C$_3$N$_4$ powder due to a much higher nitrogen content the D band appears to be significantly stronger than the G band.

Figure 4:
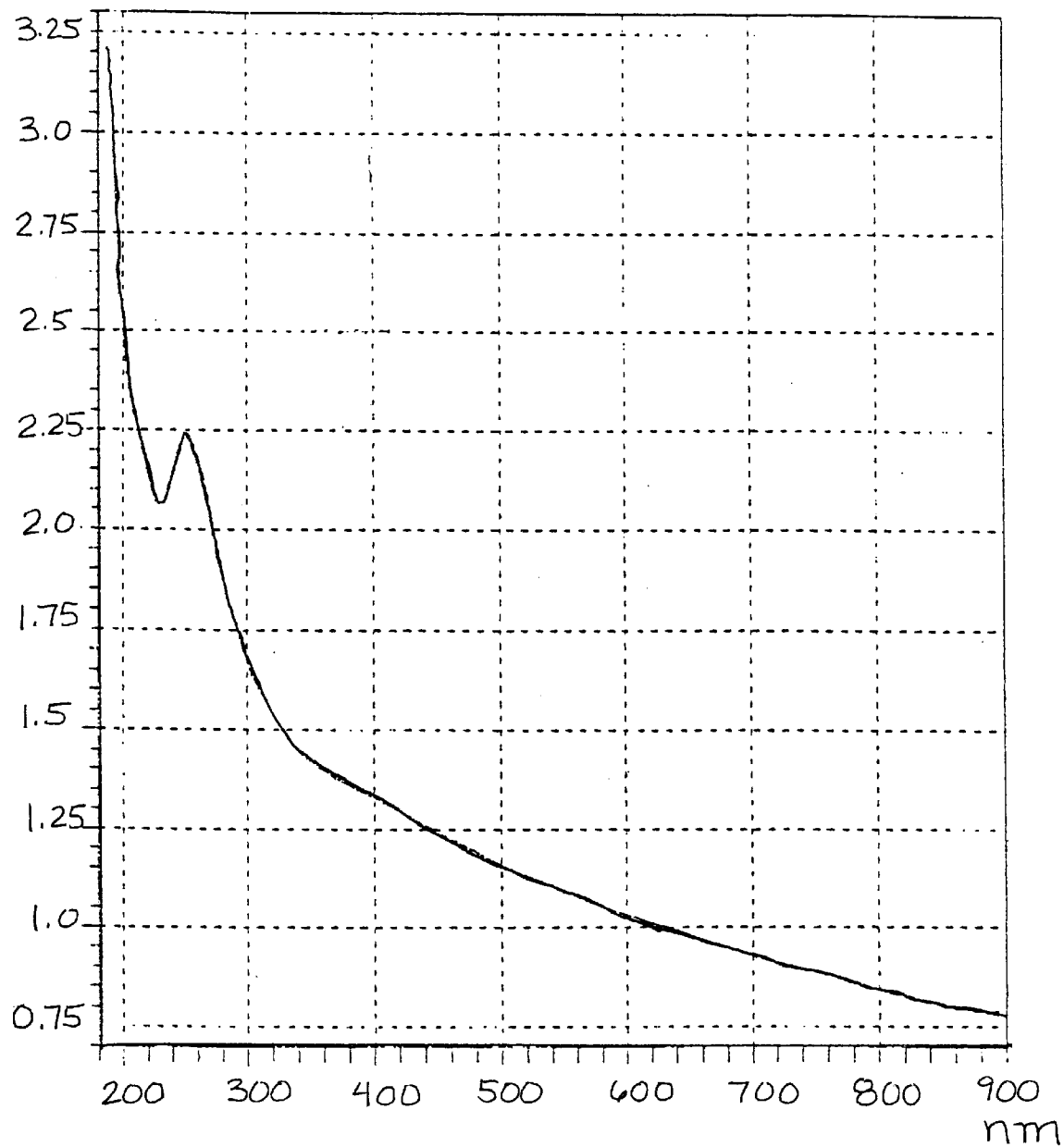
FIG. 4 is a plot showing the UV-Visible spectrum of a light-yellow aqueous solution of carbon nitride.

The presence of triazine rings in the a-C$_3$N$_4$ polymer structure is also evidenced by UV-Vis studies of the light-yellow solution produced by sonication of carbon nitride powder in water. As can be seen in FIG. 4, the observed strong absorption at 250 nm lies in the range characteristic for $\pi$–$\pi$* electronic transition in the aromatic 1,3,5-triazine compounds.[40] Additional absorption, very broad and weak, was observed in visible region at about 410 nm. Presumably, it belongs to the n–$\pi$* transitions involving lone pairs of nitrogen atoms in the polymer.

Figure 5:
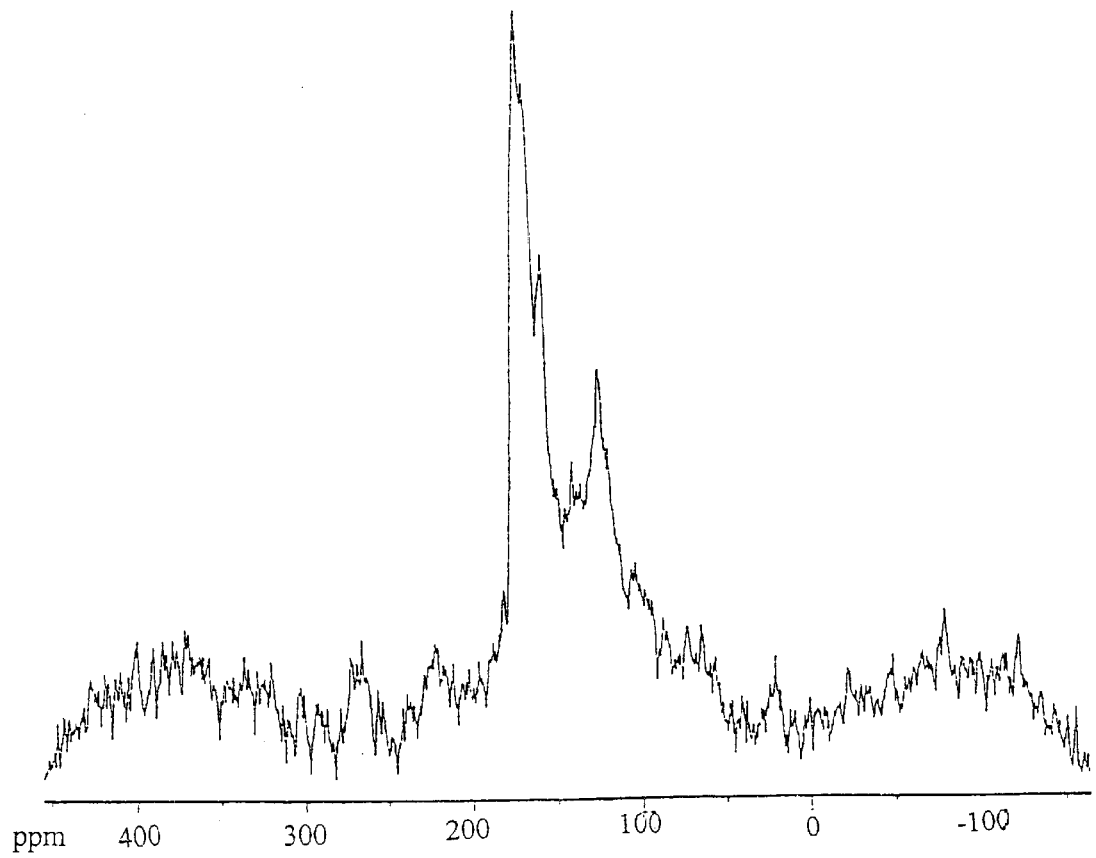
FIG. 5 is a plot showing a ($^{13}$C) MAS NMR spectrum of a-C$_3$N$_4$ powder synthesized according to the present invention.

The solid-state ($^{13}$C) MAS NMR spectrum shown in FIG. 5 exhibits two broad peaks: the larger at 168.9 ppm (with two shoulder peaks at 165.3 and 155.7 ppm) corresponding to the sp$^2$-hybridized carbon atoms from the s-triazine rings and the smaller at 123.4 ppm for the sp carbon of the cyano group.[40,41] According to this spectrum and the FTIR spectral data for non-annealed carbon nitride powder, there are practically no hydrogen atoms bonded to carbon atoms present in the polymer structure. The s-triazine ring carbon peak positions in the NMR spectrum are found to lie close to those reported for B—C—N powder synthesized from melamine and BCl$_3$ and being similarly composed from layers of triazine rings bridged by NH groups, nitrogen and boron atoms.[35] At the same time, these and our NMR data do not agree with the ($^{13}$C) NMR spectra of free-standing films of C$_3$N$_4$ stoichiometry observed earlier by Kouvetakis et al.[16], which exhibited two resonance peaks in much a higher field, at 104 and 115 ppm. These peaks were also assigned to sp$^2$ hybridized carbons in the proposed nitrogen-bridged s-triazine ring structure, identical to the structure we suggest for a-C$_3$N$_4$ powder in present work (FIG. 1). Based on large discrepancy of these data, it is not easy to agree with the structure proposed earlier for the purported $C_3N_4$ film.[16]

Figure 6:
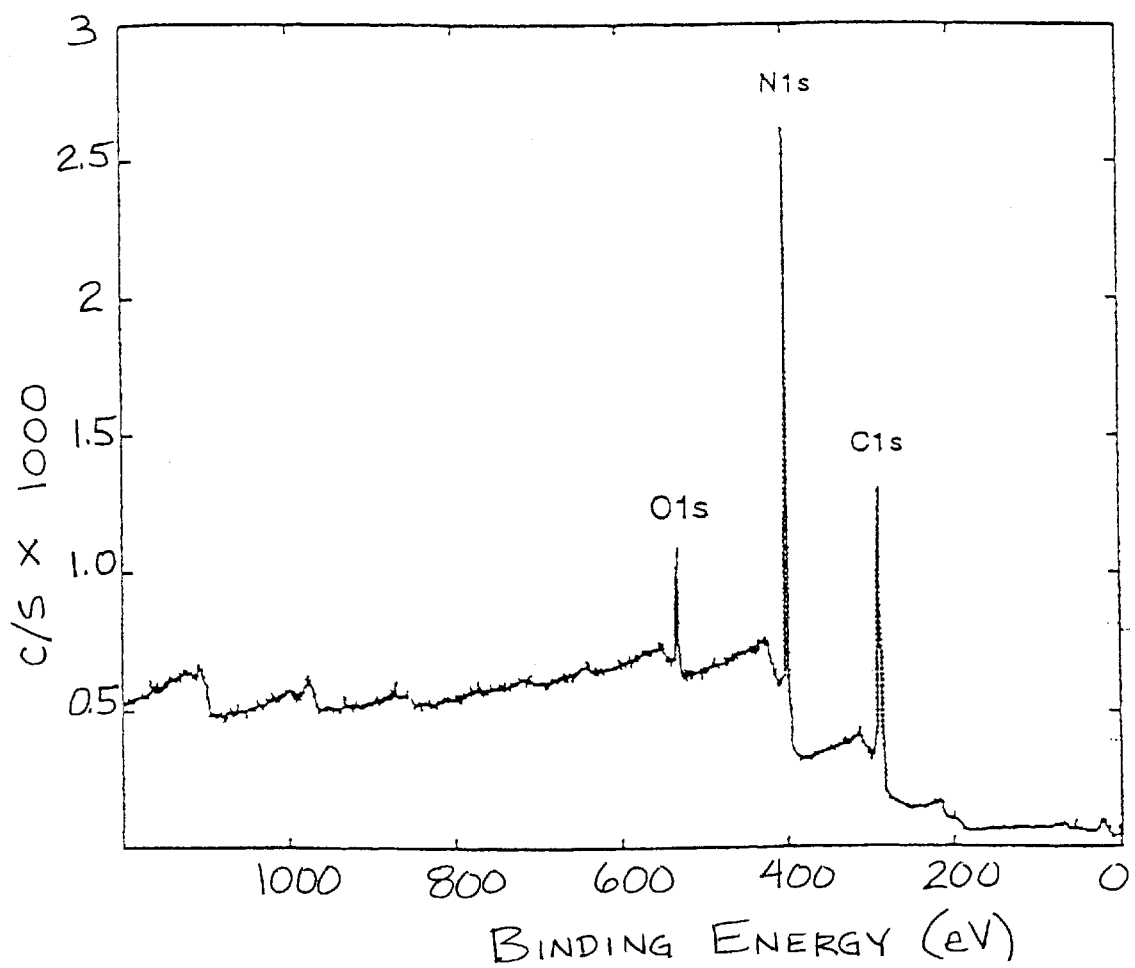
FIG. 6 is a plot showing an X-ray photoelectron spectrum (XPS) survey scan of a-C$_3$N$_4$ powder synthesized according to the present invention.
Figure 7:
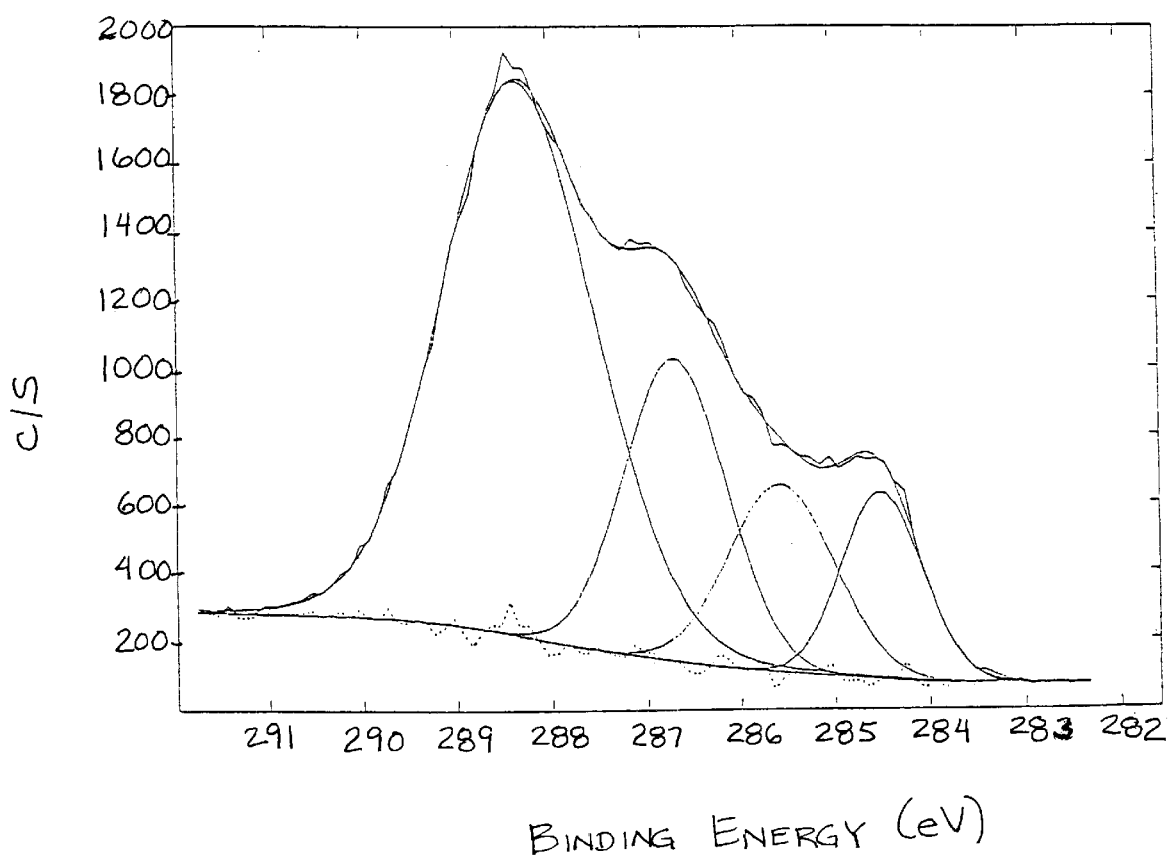
FIG. 7 is a plot showing the deconvolution of the C1s peak in the high resolution XPS scan of FIG. 6.
Figure 8:
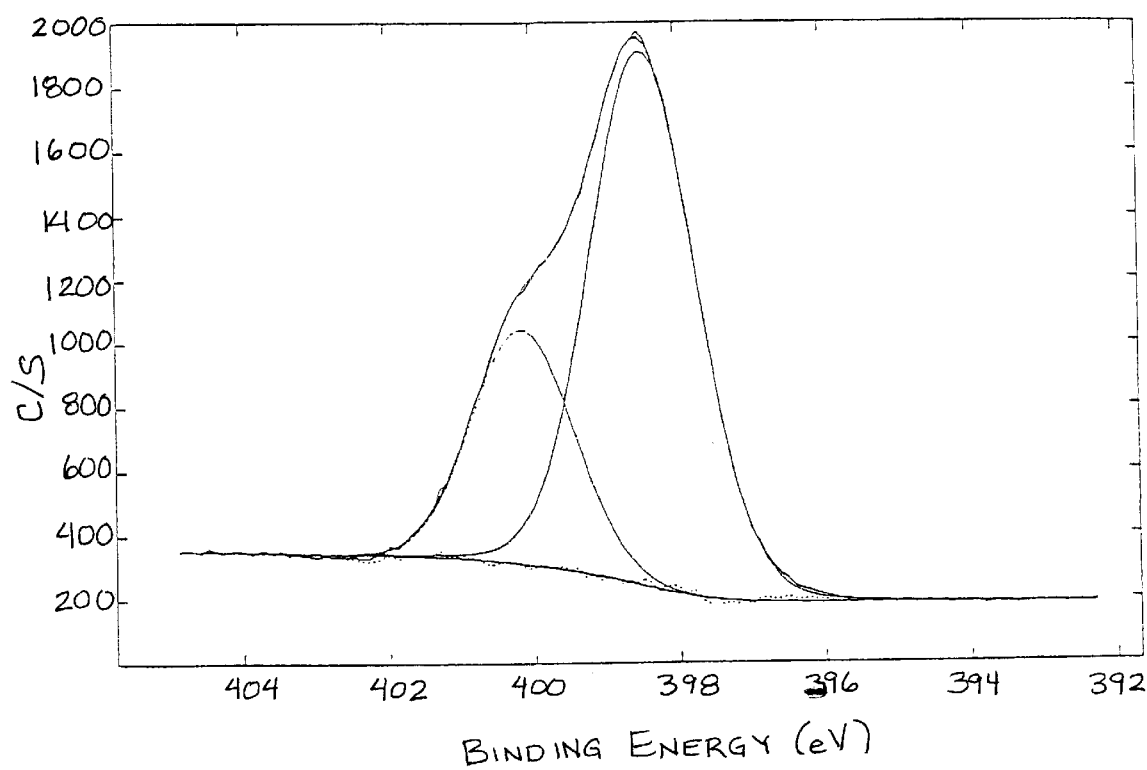
FIG. 8 is a plot showing the deconvolution of the N1s peak in the high resolution XPS scan of FIG. 6.

The XPS data support the results obtained by FTIR, UV-Vis, and NMR spectroscopy. In the XPS survey spectrum, given in FIG. 6, three observed peaks indicate that the synthesized material is composed primarily from carbon and nitrogen; however, some oxygen impurity (about 5%) is also present. Higher resolution XPS data, referenced to a peak at 284.6 eV of graphite powder taken as a standard, show that the C and N lines can be split and deconvolved. The C1s peak deconvolves as shown in FIG. 7 into a four components at binding energies of 284.5, 285.5, 286.6 and 288.1 (major component) eV, which are attributed to the C—C, C—O, C=N and C≡N bonds, respectively. The C—C peak originates from graphitic carbon, presumably formed during minor decomposition of carbon nitride sample under X-ray irradiation. The deconvolved N1s peak shown in FIG. 8 shows a major component at 398.5 eV due to nitrogen, $sp^2$-bonded to carbon, and a shoulder peak at a higher binding energy, 400.1 eV, assigned to sp-bonded nitrogen in the terminal C≡N groups. The XPS data thus strongly suggest that the graphite-like $sp^2$-bonded structure of FIG. 1 is most likely for the carbo-nitride powders.

Figure 9:
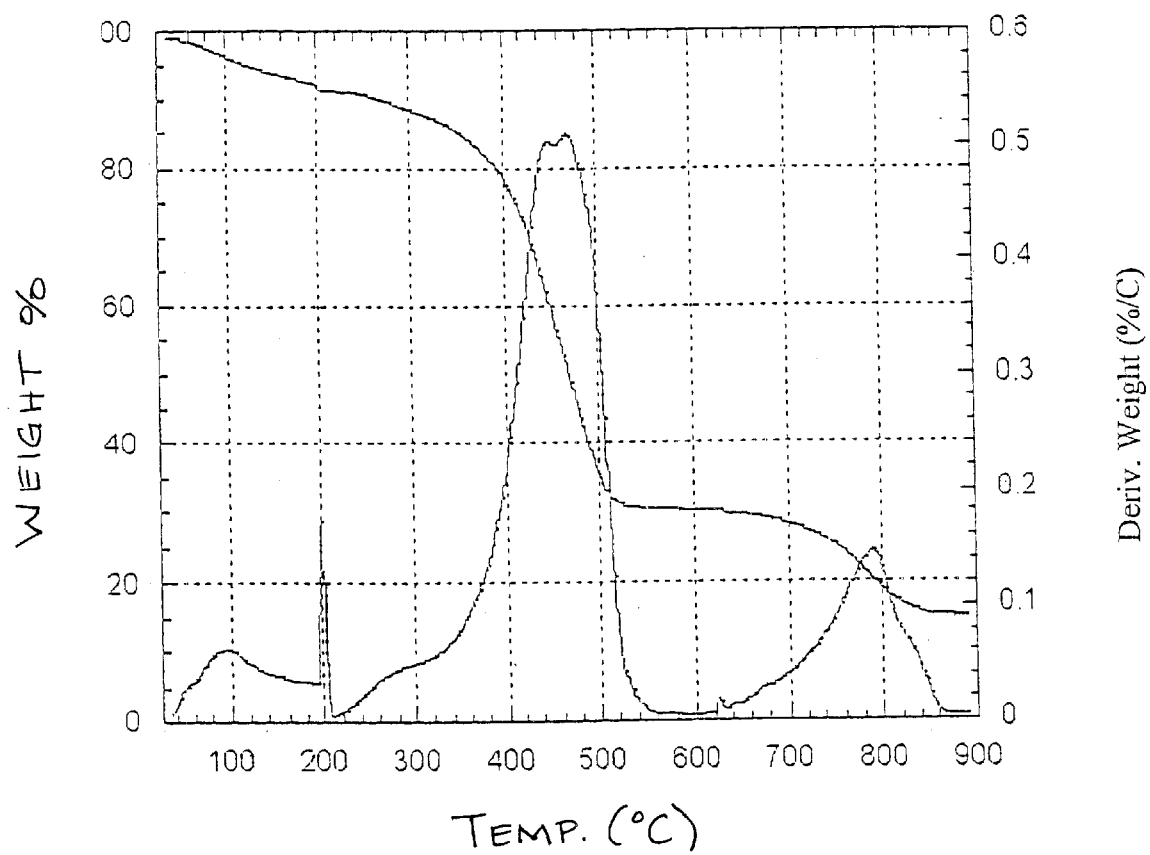
FIG. 9 is a TGA/DTA data plot for a-C$_3$N$_4$ carbon nitride in air.
Figure 10:
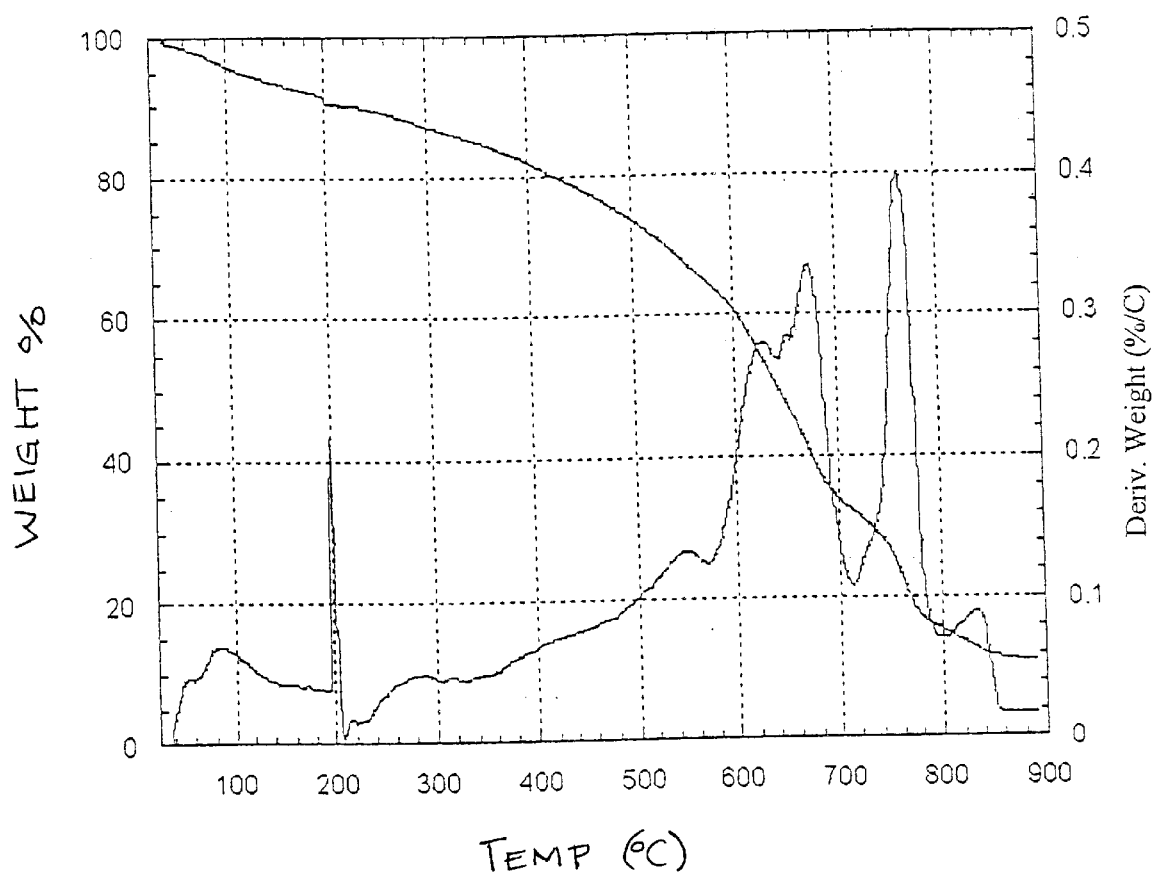
FIG. 10 is a TGA/DTA data plot for a-C$_3$N$_4$ carbon nitride in argon.
Figure 11:
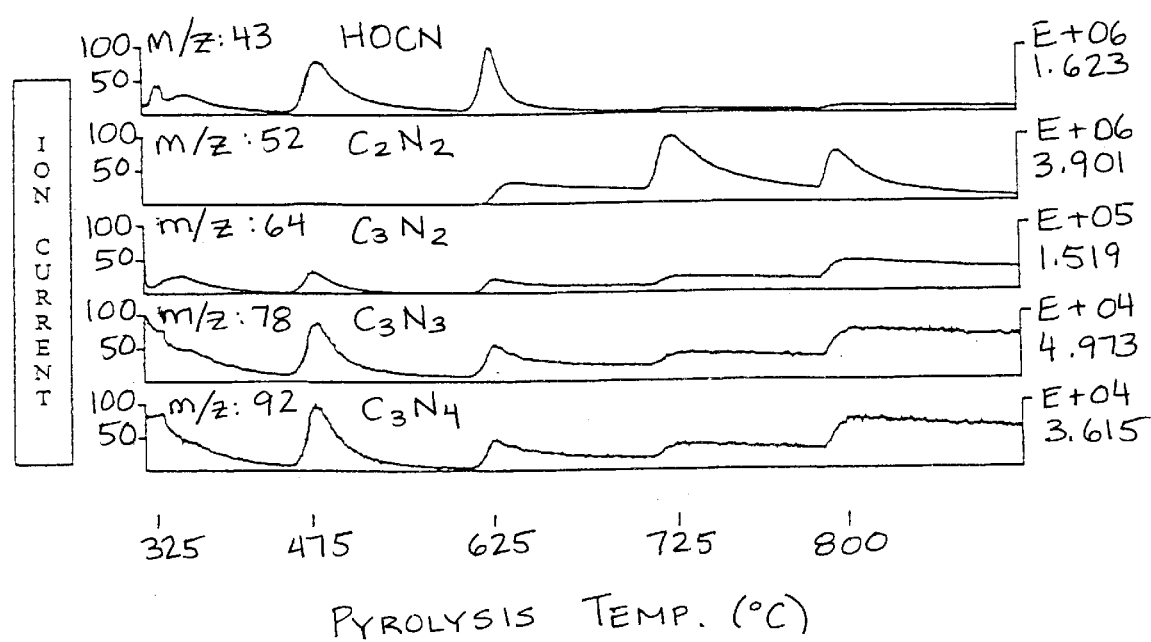
FIG. 11 is a plot showing electron ionization mass spectra of the evolution products of stepped pyrolysis of the present a-C$_3$N$_4$ carbon nitride polymer at various temperatures.

These observations also agree with the TGA/DTA and vacuum pyrolysis-MS analyses. The TGA/DTA data plots for carbon nitride powder are shown in FIGS. 9 and 10. They show that this material is significantly less thermally stable in air (FIG. 9) than in an inert atmosphere (FIG. 10), undergoing stepwise decomposition in both cases. Major weight loss in argon is observed at temperatures above 550° C., in comparison with the 400° C. on air. According to mass spectral study of evolution products, in which only ions with mass numbers (m/z) higher than 35 were detected (FIG. 11), the mass loss above 450° C. is in part due to cyanic acid HOCN (mn/z=43) and most likely ammonia, as evidenced by FTIR studies of annealed material at similar temperatures (FIG. 2b). At a higher temperatures (up to 900° C.) the evolution of other species, detected by the mass fragments at m/z=52 ($C_2N_2^+$), 64 ($C_3N_2^+$), 78 ($C_3N_3^+$), and 92 ($C_3N_4^+$), were observed as well. These data provide clear evidence for formation of cyanogen $(CN)_2$ and heavier $C_3N_x$ species as a result of fragmentation of triazine rings being a major unit in the suggested polymer structure of the $C_3N_4$ material.

All synthesized a-$C_3N_4$ powders are amorphous, therefore, only a very broad reflection centered at about 3.0 Å could be detected in XRD measurements. These data do not look like the XRD patterns of the carbon nitride synthesized, according to Kawaguchi et al.[43], from the similar reagents ($C_3N_3Cl_3$ and $Li_3N$) but under reaction conditions that differ from those described herein. Based on diffuse reflectance UV-Vis spectra of the powder, optical bandgap for a-$C_3N_4$ material was estimated to be approximately 3.1 eV. We were able to perform densification of micronized $C_3N_4$ powders by cold isothermal pressing at pressure of 55000 PSI. The disk-shaped ceramics formed had densities of about 1.34–1.38 g/cm$^3$, which is much lighter than graphite (d=2.25 g/cm$^3$). The linear electric resistivities of these ceramics, measured at about 0.67 Megaohm.cm, lie close to those of blue diamond semiconductors. Because of wide bandgap semiconducting properties, the undoped and doped carbon nitride ceramics suggest testing for possible application as secondary electron emitters. In addition, the ceramic disks of a-$C_3N_4$ can be studied for application as targets for laser ablation in the deposition processes of potentially ultrahard C—N films.

Proposed Synthesis of β-$C_3N_4$

Figure 12:
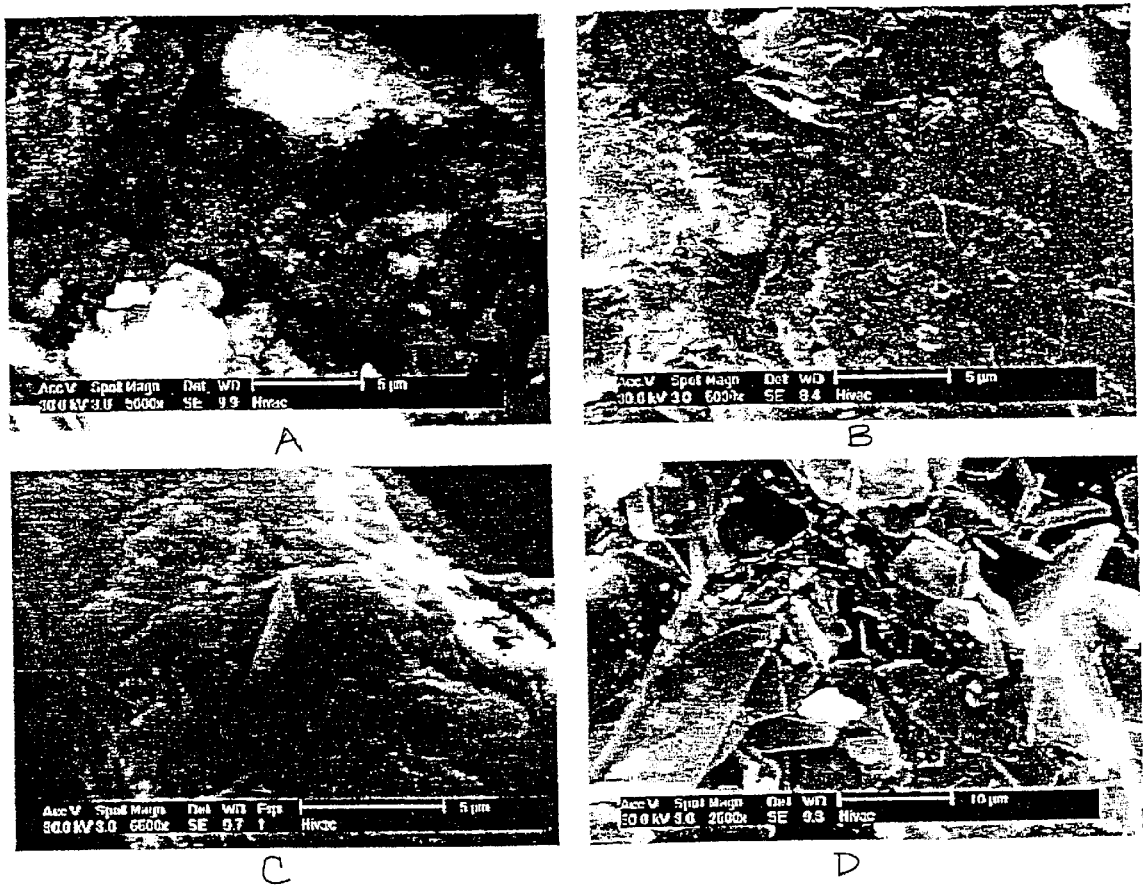
FIG. 12 are scanning electron micrographs of the following: (a) a-C$_3$N$_4$ powder, (b) densified material obtained after exposure of powder to high pressure of 8 GPa at room temperature, (c) the material obtained from powder after exposure to high pressure of 12 GPa at 400° C.; (d) pure carbon graphite material produced from a-C$_3$N$_4$ powder after exposure to high pressure of 8 GPa at 1200° C.

Finally, based on availability of stoichiometric $sp^2$-bonded carbon nitride (a-$C_3N_4$) as a result of present work, we have carried out a series of high pressure experiments in pursuit of large crystals of superhard β-$C_3N_4$ and other predicted polymorphs while using the amorphous a-$C_3N_4$ powder as a precursor. According to SEM (FIG. 12), EDAX, micro-Raman and powder X-ray studies, under pressures of 8 to 12 GPa the structure of carbon nitride changes from amorphous (FIG. 12a) to a more ordered layered graphite-like structure with interplane d-spacing of about 3.0–3.1 Å, retaining the $C_3N_4$ stoichiometry at temperatures of up to 400° C. (FIG. 12c). The TEM studies, however, did not reveal the presence of any (nano- or micro) crystalline phases of carbon nitride, which means that the material still remains amorphous although well densified under pressure.

This material loses nitrogen at higher temperatures (up to 1200° C.) and converts into a pure carbon phase of graphite with d-spacing of 3.34 Å (FIG. 12d). These preliminary experiments allowed us to determine so far the temperature range where the phase transformation of carbon nitride starts to occur without change of the $C_3N_4$ composition. The formation of crystalline phases, predicted to be superhard, probably will require application of higher pressures than tested so far, or catalysts.

The difficulties in the synthesis of hard carbon nitrides, such as β-$C_3N_4$, are very likely related to their low thermodynamic stability with respect to the elements (C and $N_2$), indicated by a positive values of enthalpies of formation[23]. In other words, the atoms readily revert to their unbonded carbon and nitrogen states. LDA calculations predict that $sp^3$-bonded β-$C_3N_4$ phase is only about 20 kJ/mol less stable than $sp^2$-bonded a-$C_3N_4$. This implies that, similar to the graphite/diamond and h-BN/c-BN transformations that occur under high pressure/high temperature conditions, the crystalline $sp^3$-bonded carbon nitride can be synthesized from the $sp^2$-bonded graphite-like carbon nitride.

The syntheses of large crystals of β-$C_3N_4$ as well as other polymorphs appear to be very promising using the bulk quantities of stoichiometric $sp^2$-bonded carbon nitride as precursor.

Other Carbo-nitrides

As mentioned above, the techniques of the present invention are not limited to the synthesis of a-$C_3N_4$. Other binary compositions, as well as ternary and quaternary systems can be made using the present techniques. Examples of such compositions include, but are not limited to: $B_3C_3N_7$ (made from $NaBF_4/C_3N_3X_3$ and $Li_3N$).

CONCLUSION

The powder synthesis of gram quantities of amorphous carbon nitride with the stoichiometry very close to $C_3N_4$ has been achieved in the present work. The demonstrated approach, which is based on fast solid state reactions, is particularly attractive since: (i) it uses the relatively cheap reagents and does not require synthesis of single-source precursors, as in the previously reported preparation of carbo-nitride[16,44,45]; (ii) it produces powders with a higher nitrogen content than, for example, the carbon nitride powders of approximately $C_4N_5$ stoichiometry described in a German patent[45], (iii) the reaction routes, leading to production of covalently bonded not only binary, but also ternary and quaternary carbo-nitride materials with controlled stoichiometry, morphology, mechanical and electric properties can probably be designed. We have recently verified the flexibility of this approach by successful synthesis of amorphous B—C—N powders of approximate $B_3C_3N_7$ stoichiometry, and extended our current work to preparation of other carbo-nitride materials.

REFERENCES (1) Cohen, M. L. IPhys. Rev. B 1985, 32, 7988.
(2) Liu, A. Y.; Cohen, M. L. Science 1989, 245, 841.
(3) Liu, A. Y.; Cohen, M. L. Phys. Rev. B 1990, 41, 10727.
(4) Itoh, S. Diamond Films Technol. 1997, 7, 195.
(5) Kawaguchi, K. Adv. Mater. 1997, 9, 615.
(6) Kar, T.; Cuma, M.; Scheiner, S. J. Phys. Chem. A 1998, 102, 10134.
(7) Riedel, R.; Kienzle, A.; Dressler, W.; Ruwisch, L.; Bull, J.; Aldinger, F. Nature 1996, 382, 796.
(8) Rooke, M. A.; Sherwood, P. M. A. Chem. Mater. 1997, 9, 285.
(9) Williams, D.; Kouvetakis, J.; O'Keeffe, M. Inorg. Chem. 1998, 37, 4617.
(10) Brousseau, L. C.; Williams, D. J.; Kouvetakis, J.; O'Keeffe, M. J. Am. Chem. Soc. 1997, 119, 6292.
(11) Teter, D. M.; Hemley, R. J. Science 1996, 271, 53.
(12) Lowther, J. E. Phys. Rev. B 1999, 59, 11683.
(13) Zhang, Z.; Guo, H.; Zhong, G.; Yu, F.; Xiong, Q.; Fan, X. Thin Solid Films 1999, 346, 96.
(14) Alves, I.; Demazeau, G.; Tanguy, B.; Weill, F. Solid State Comm. 1999, 109,697.
(15) Wang, E.-G. Adv. Mater. 1999, 11, 1129; and references therein.
(16) Kouvetakis, J.; Bandari, A.; Todd, M.; Wilkens, B. Chem. Mater. 1994, 6, 811.
(17) Niu, C. M.; Lu, Y. Z.; Lieber, C. M. Science 1993, 261, 334.
(18) Bhusari, D. M.; Chen, C. K.; Chen, K. H.; Chen, T. J.; Chen, L. C.; Lin, M. C. J. Mater. Res. 1997, 12, 322.
(19) Chen, Y.; Guo, L.; Wang, E. G. Philos. Mag. Lett. 1997, 75, 155.
(20) Hu, J.; Yang, P.; Lieber, C. M. Phys. Rev. B 1998, 57, 3185.
(21) Z. Zhang, H. Guo, G. Zhong, F. Yu, Q. Xiong, X. Fan, Thin Solid Films 1999, 346, 96.
(22) Kroll, P.; Hoffmann, R. J. Am. Chem. Soc. 1999, 121, 4696.
(23) Nesting, D. C.; Badding, J. V. Chem. Mater. 1996, 8, 1535.
(24) Badding, J. V. Ann. Rev. Mater. Sci. 1998, 28, 631.
(25) He, D. W.; Zhang, F. X.; Zhang, X. Y.; Qin, Z. C.; Zhang, M.; Liu, R. P.; Xu, Y. F.; Wang, W. K. J. Mater. Res. 1998, 13, 3458.
(26) Wiley, J. B.; Kaner, R. B. Science 1992, 255, 1093.
(27) Fitzmaurice, J. C.; Hector, A. L.; Parkin, I. P. J. Chem. Soc. Dalton Trans. 1993, 2435.
(28) Xie, Y.; Qian, Y.; Wang, W.; Zhang, S.; Zhang, Y. Science 1996, 272,1926.
(29) (a) Khabashesku, V. N.; Schultz, J. A.;. Hauge, R. H.; Margrave, J. L. Proceedings of International Conference on Low-Temperature Chemistry, Sep. 5–9, 1994, Moscow, Russia, Abstr., p. 81. (b) Khabashesku, V. N.; Margrave, J. L. Proceedings of the IXth International Conference on High Temperature Materials, May 19–23, 1997, Penn State, University Park, p. 108. (c) Khabashesku, V. N.; Margrave, J. L.; Waters, K.; Schultz J. A. Thin Solid Films, 2000, in press.
(30) Bernard, D. J.; Linnen, C.; Harker, A.; Michels, H. H.; Addison, J. B.; Ondercin. B. J. Phys. Chem. B 1998, 102, 6010.
(31) Zhang, M.; Nakayama, Y. J. Appl. Phys. 1997, 82, 4912.
(32) Lin-Vien, D.; Colthup, N. B.; Fatelley, W. G.; Grasselli, J. G. The Handbook of Infrared and Raman Characteristic Frequencies of Organic Molecules; Academic Press Inc.: San Diego, Calif., 1991, p. 299.
(33) May, H. J. Appl. Chem. 1959, 9, 340.
(34) Togashi, H.; Koga, T.; Kakudate, Y.; Fujiwara, S.; Kubota, M.; Fukuda, K.; Nakagawa, H.; Kawaguchi, M. Rapid. Commun. Mass. Spectrom. 1994, 8, 465.
(35) Popov, C.; Saito, K.; Yamamoto, K.; Ouchi, A.; Nakamura, T.; Ohana, Y.; Koga. Y. J. Mater. Sci. 1998, 33, 1281.
(36) Costa, L.; Camino, G. J. Thermal. Anal. 1988, 34, 423.
(37) Lu, T. R.; Chen, L. C.; Chen, K. H.; Bhusari, D. M.; Chen, T. M.; Kuo, C. T. Thin Solid Films 1998, 332, 74.
(38) Bousetta, A.; Lu, M.; Bensaoula, A.; Schultz, J. A. Appl. Phys. Lett. 1994, 65, 696.
(39) Lu, Y. F.; Ren, Z. M.; Chong, T. C.; Cheong, B. A.; Pang, S. I.; Wang, J. P.; Li, K. J. Appl. Phys. 1999, 86, 4954.
(40) Quirke, J. M. E. 1,3,5-Triazines in Comprehensive Heterocyclic Chemistry, Vol. 3, Katritzky, A. R. Ed., Pergamon Press, Oxford-New York-Toronto-Sydney-Paris-Frankfurt, 1984, pp. 463, 464.
(41) Wehrli, F. W.; Wirthlin, T. Interpretation of Carbon-13 NMR Spectra, Heyden, London-New York-Rheine, 1976.
(42) Beamson, G.; Briggs, D. High Resolution XPS of Organic Polymers, Wiley, N.Y., 1992.
(43) Kawaguchi, M.; Tokimatsu, Y.; Nozaki, K.; Kabaragi, Y.; Hishiyama, Y. Chem. Lett. 1997, 10, 1003.
(44) Riedel, R.; Kroke, E.; Greiner, A.; Gabriel, O.; Ruwisch, L.; Nocolich, J. Chem. Mater. 1998, 10, 2964.
(45). Riedel, R.; Kroke, E.; Greiner, A. German Patent DE 197 06 028.5, 1997.

What is claimed is:

1. A method for making a carbon nitride, comprising:
    (a) combining a powdered halogenated triazine with a powdered alkaline metal nitride to form a reagent mixture; and
    (b) heating the reagent mixture to a predetermined reaction temperature so as to form the carbon nitride.

2. The method according to claim 1, further including the steps of cooling the carbon nitride and washing the carbon nitride to remove reaction by-products.

3. The method according to claim 1 wherein the powdered halogenated triazine has the formula $C_3N_3X_3$ where X is a halogen.

4. The method according to claim 1 wherein the powdered alkaline metal nitride has the formula $M_3N$ where M is an alkaline metal.

5. The method according to claim 1 wherein step (b) is carried out in the presence of a transition metal.

6. The method according to claim 1 wherein step (b) is carried out in the absence of a transition metal.

7. The method according to claim 1 wherein the predetermined reaction temperature is between about 320° C. and about 400° C.

8. The method according to claim 1 wherein the powdered halogenated triazine comprises $C_3N_3Cl_3$.

9. The method according to claim 1 wherein the powdered alkaline metal nitride comprises $Li_3N$.

10. The method according to claim 1 wherein step (b) includes maintaining the reagent mixture at or above the predetermined reaction temperature for a predetermined amount of time.

11. The method according to claim 1 wherein step (b) includes maintaining the reagent mixture at or above the predetermined reaction temperature for less than 24 hours.

12. An amorphous carbon nitride having a carbon to nitrogen ratio of about 3:4 made according to the method comprising:
    (a) combining a powdered halogenated triazine with a powdered alkaline metal nitride to form a reagent mixture; and (b) heating the reagent mixture to a predetermined reaction temperature.

13. The carbon nitride of claim 12 wherein the method further includes the steps of cooling the carbon nitride and washing the carbon nitride to remove reaction by-products.

14. The carbon nitride of claim 12 wherein the powdered halogenated triazine has the formula $C_3N_3X_3$ where X is a halogen.

15. The carbon nitride of claim 12 wherein the powdered alkaline metal nitride has the formula $M_3N$ where M is an alkaline metal.

16. The carbon nitride of claim 12 wherein the predetermined reaction temperature is between about 320° C. and about 400° C.

17. The carbon nitride of claim 12 wherein the powdered halogenated triazine comprises $C_3N_3Cl_3$.

18. The carbon nitride of claim 12 wherein the powdered alkaline metal nitride comprises $Li_3N$.

19. The carbon nitride of claim 12 wherein step (b) of the method includes maintaining the reagent mixture at or above the predetermined reaction temperature for a predetermined amount of time.

20. An amorphous carbon nitride having a carbon to nitrogen ratio of about 3:4.

21. The carbon nitride of claim 20 having an FTIR spectrum that includes broad bands at 3424 and 1627 $cm^{-1}$, a weak band at 2162 $cm^{-1}$, and a group of multiple bands at 1561 $cm^{-1}$, 1490 and 1421 $cm^{-1}$, and 805 $cm^{-1}$, and a strong band at 1314 $cm^{-1}$.

22. The carbon nitride of claim 20 having a Raman spectrum that includes two broad peaks with a D band maximum at about 1340 and a G band maximum at about 1545 $cm^{-1}$, in which the D band is at least 5 percent stronger than the G band.

23. The carbon nitride of claim 20 that forms a light-yellow solution when sonicated in water, the solutions demonstrating strong absorption at 250 nm in UV-Vis studies.

24. The carbon nitride of claim 20 having a solid-state ($^{13}C$) MAS NMR spectrum that includes two broad peaks, namely a larger peak at 168.9 ppm having two shoulder peaks at 165.3 and 155.7 ppm and a smaller peak at 123.4 ppm.

* * * * *